United States Patent [19]
Cook et al.

[11] 3,789,082
[45] Jan. 29, 1974

[54] ISOMERISATION OF PARAFFIN HYDROCARBONS

[75] Inventors: Terence John Cook, Twickenham; Martin Frederick Olive, Lightwater, both of England

[73] Assignee: The British Petroleum Company Limited, London, England

[22] Filed: Jan. 5, 1972

[21] Appl. No.: 215,650

[30] Foreign Application Priority Data
Jan. 26, 1971 Great Britain..................... 03161/71

[52] U.S. Cl. .......................................... 260/683.68
[51] Int. Cl............................. C07c 5/24, C07c 5/28
[58] Field of Search .. 260/683.68, 683.65; 208/138, 208/139

[56] References Cited
UNITED STATES PATENTS

| | | | |
|---|---|---|---|
| 3,248,320 | 4/1966 | White et al. | 260/683.68 |
| 2,939,896 | 6/1960 | Myers | 260/683.68 |
| 3,242,229 | 3/1966 | Estes | 260/683.68 |
| 3,218,267 | 11/1965 | Goble et al. | 260/683.68 |
| 3,527,715 | 9/1970 | Giannetti et al. | 260/683.68 |
| 3,419,503 | 12/1968 | Giannetti et al. | 260/683.68 |

Primary Examiner—Delbert E. Gantz
Assistant Examiner—G. J. Crasanakis

[57] ABSTRACT

In the start up of a paraffin isomerisation process operating at 100°–204° C in the presence of HCL or a compound decomposable to it as activating agent, the catalyst bed is brought to at least 100°C, preferably, at least 130°C before the feedstock and activating agent contact the bed. Starting up the process in conventional manner at low temperature and gradually bringing the temperature up in the presence of feedstock and activating agent partially deactivates the catalyst.

The preferred catalyst is one obtained by chlorinating platinum-alumina with $CCl_4$ or an analogous derivative of methane and the preferred activating agent is $CCl_4$. Preferred feedstocks are $C_4$–$C_6$ paraffins, possibly containing 0.1–5% wt.

11 Claims, No Drawings

ISOMERISATION OF PARAFFIN HYDROCARBONS

This invention relates to the isomerisation of paraffin hydrocarbons in the gasoline boiling range (i.e. $C_4$ – 204°C) at temperatures in the range 100°–204°C, and particularly to the isomerisation of $C_4$, $C_5$ and $C_6$ paraffins.

Low temperature isomerisation using fixed catalyst beds is now well established. The catalysts comprise a hydrogenating metal, usually a platinum group metal, on a refractory inorganic oxide support, usually alumina, to which chlorine has been added. To obtain a low temperature isomerisation catalyst the method of chlorination is critical and various methods of chlorination have been proposed, the principal methods being contactng the support with a. a chlorinated hydrocarbon of general formula

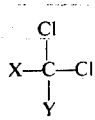

(where X and Y may be the same or different and selected from H, Cl, Br, F or SCl, or where X and Y together may be O or S). The preparation of this type of catalyst is described in U.K. Patent Specification No. 953187 and its use for low temperature isomerisation in U.K. Patent Specification No. 953189.

b. an organic chloride activating agent containing at least 2 carbon atoms and an atomic ratio of hydrogen to chlorine of less than 1.0, e.g. chlorinated derivatives of ethane or ethylene having at least 4 chlorine atoms. U.K. Patent Specifications disclosing activating agents of this type are 976941, 1061369 and 1081120.

c. methylchloroform (U.S. Patent No. 3527717).

d. thionyl chloride or other compound of sulphur and chlorine having the general formula $S_nO_aX_bY_c$ (where S is sulphur, O is oxygen, X is chlorine and Y is a halogen other than chlorine, $n = 1$ or 2, $a = 0, 1, 2, 3$ or 5, $b = 2, 4$ or 7, $c = 0$ or 1 and the sum of $b$ and $c$ is 2 to 8). The use of thionyl chloride is described in U.K. Patent Specification No. 1028572 and the generic formula in U.K. Patent Specification No. 1087586.

e. gaseous chlorine together with certain hydrocarbons or chlorinated hydrocarbons (U.K. Patent Specification No. 1155516) or together with sulphur dioxide (U.S. Patent Specification No. 3472790).

f. vapour of aluminium chloride followed by heating to above 300°C to remove unreacted aluminium chloride (U.K. Patent Specification No. 822998).

In cases (a) to (e) above the contacting should be under essentially non-reducing conditions and at a temperature such that there is no formation of aluminium chloride. The use of oxidising conditions is preferred and may be necessary with the chlorinating agents having 2 or more carbon atoms. The simplest and preferred compounds are those of case (a) above, the particularly preferred compounds being $CCl_4$, $CHCl_3$ and 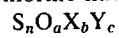$CH_2Cl_2$.

These isomerisation catalysts may be used under relatively mild conditions, e.g. within the following ranges

| | |
|---|---|
| Temperature | 10–204°C |
| Pressure | 0–2000 psig |
| Space velocity | 0.2–20 v/v/hr |
| Hydrogen:hydrocarbon mole ratio | 0.01:1–20:1 |

0.01 to 5 percent wt by weight of feedstock of hydrogen chloride or a compound decomposable to hydrogen chloride under the reaction conditions may be added to the reaction zone as an activating agent to increase or maintain catalyst activity. Such addition when using the catalysts prepared as in (a) above is described and claimed in UK Patent Specification No. 953188.

There are practical difficulties in injecting HCl into the reaction system, particularly at elevated pressure, so the use of a compound decomposable to HCl is preferred. Preferred compounds are chloro-substituted derivatives of hydrocarbons, for example, chloro-substituted derivatives of $C_1$–$C_4$ aliphatic hydrocarbons. The preferred compound is carbon tetrachloride.

In starting up low temperature isomerisation processes particularly those using catalysts prepared with the chlorinating agents of case (a) above, the normal procedure would be that generally adopted for hydrocatalytic processes, viz. introducing hydrogen at low temperature, pressuring up as necessary, then introducing the feedstock and activating agent also at a low temperature and then gradually bringing the system up to the desired operating temperature. This procedure is normally adopted as a precaution to guard against excessive catalyst activity in the early stages leading to a temperature runaway and generally to keep control of the system.

It has now been found that this standard procedure lowers catalyst activity and that improved results are obtained if the feedstock and activating agent are not introduced until the catalyst bed is at the desired operating temperature. It has also been found that introduction of the feedstock and activating agent at the operating temperature does not lead to any loss of control.

According to the present invention a method of starting up a process for the isomerisation of paraffins boiling in the gasoline boiling range at a temperature in the range 100° to 204°C in the presence of hydrogen, and a catalyst active for isomerisation at 100° to 204°C comprising a hydrogenating metal, a refractory inorganic oxide support and chlorine, and in the presence of from 0.01 to 5 percent wt by weight of feedstock of an activating agent comprising hydrogen chloride or a compound decomposable to hydrogen chloride under the reaction conditions is characterised in that the catalyst bed is brought to an operating temperature in the range 100°–204°C in the presence of hydrogen and that the paraffin feedstock and activating agent do not contact the catalyst bed until the bed is at said operating temperature.

Although isomerisation catalysts may be active at temperatures below 100°C, the starting temperatures used are above 100°C and the preferred temperature is in the range 130° to 204°C. Desirably the feedstock is also heated to the operating temperature before it contacts the catalyst bed. The isomerisation reaction is mildly exothermic and the term "operating temperature" means the temperature at the inlet end of the catalyst bed.

The activating agent and the amount used may be as described above. The preferred quantity is 0.1 to 2 percent wt by weight of feedstock, and it is preferably added to the reaction system by adding it to the feedstock entering the system.

The operating pressure may be in the range 0–2,000 psig, preferably 225–1,500 psig and more particularly 350–1,200 psig. Preferably the catalyst bed is at the desired operating pressure before the feedstock and activating agent contact it.

The other main process variables of the isomerisation process may be

Feedstock space velocity v/v/hr 0.2–20, preferably 1–10

$H_2$:hydrocarbon mole ratio — 0.01:1–20:1 preferably 0.1:1–15:1

The desired operating temperature and other process variables for any given feedstock will depend on its composition and the extent of isomerisation required and can readily be determined, if necessary, by preliminary experiments.

The start-up procedure may be used with an initial charge of fresh catalyst or, in the case of regenerable catalysts, after reactivation and/or regeneration. After reactivation or regeneration the catalyst bed may be well above the desired operating temperature and it is to be understood that the present invention includes cooling down to, as well as bringing up to, the operating temperature.

Having regard to the discussion above, the preferred method of start up is thus i. purge with nitrogen and/or vacuum to remove any oxygen, ii. introduce hydrogen and bring the pressure up to a moderate pressure of about 200 psig, iii. initiate recycle of hydrogen and bring the catalyst bed to a pressure of at least 225 psig, preferably at least 350 psig, and a temperature of at least 100°C, preferably at least 130°C, iv. introduce the feedstock and activating agent preheated to a temperature of at least 100°C, preferably at least 130°C.

The preferred feedstocks are straight run petroleum fractions and more particularly $C_4$ and/or $C_5$ and/or $C_6$ fractions. In addition to paraffins, petroleum fractions may contain 0.5 to 25 percent wt of naphthenes, 0.001 to 10 percent wt of aromatics and 0.001 to 1 percent wt of sulphur, present as organic sulphur compounds. Naphthenes depress catalyst activity temporarily and aromatics and sulphur compounds are permanent poisons. Because of this it has been proposed that sulphur compounds and aromatics should be reduced by desulphurisation and hydrogenation as necessary to levels of less than 0.001 percent wt in each case. Naphthenes may also be limited to less than 10 percent wt, preferably less than 5 percent wt.

It has been found that the present invention gives improved results with substantially aromatic-free feedstocks (i.e. those with less than 0.001 percent wt aromatics) and with aromatic-containing feedstocks (e.g. those with 0.001 to 10 percent wt aromatics, particularly 0.1 to 5 percent wt aromatics). The greatest improvement is, however, with the latter. Without being bound by any theory it is, suggested that the present invention operates, at least in part by ensuring that the temperature is high enough to ensure rapid hydrogenation of the activating agent to HCl and/or rapid hydrogenation of the aromatics. It should be emphasised that adding feedstock and activating agent at a low temperature results in a permanent deactivation of the catalyst and is not merely a temporary effect associated with the lower operating temperature.

Other features of the isomerisation process may follow known practice e.g. as disclosed in U.K. Patent Specifications Nos. 953188, 953189 and 1038867. The hydrogenating metal may be up to 25 percent wt of one or more metals or compounds thereof having hydrogenating activity selected from Groups VIa and VIII of the Periodic Table according to Mendeleef, particularly 0.01 to 5 percent wt of a platinum group metal which is preferably platinum or palladium. The preferred inorganic oxide support is alumina. At least in the case of chlorinating compounds other than aluminium chloride, the alumina preferably has a surface area of at least 250 m²/g and is preferably derived from an alumina hydrate precursor in which β-alumina trihydrate (Bayerite) predominates. The chlorine content of the catalyst may be 1–15 percent wt, particularly 8–15 percent wt, and is desirably related to the original surface area of the alumina, being from 2.0 to 3.5 × $10^{-4}$ g/m². In the catalyst preparation, the chlorination temperature may be in the range 149°–593°C, particularly 149°–371°C, and the rate of addition of the chlorine compound in adiabatic preparations is preferably such that its partial pressure does not exceed 0.2 psi. As indicated earlier the conditions should be non-reducing and may be oxidising conditions and, preferably, a carrier gas is used, which may be nitrogen, air or oxygen at a flow rate of at least 50 lbs/hour/sq.ft. of catalyst bed. The chlorination is desirably carried out in situ in the reactor and the conditions specified above are chosen so that the chlorinating compound is not reduced to HCl and so that the formation of aluminium chloride and volatile hydrogenating metal-chlorine complexes is minimised. The active catalyst is susceptible to hydrolysis with water and should be kept from contact with it during and after the preparation.

Except in the case of catalysts prepared from aluminium chloride the catalysts may be reactivated with hydrogen or nitrogen at 260°–558°C and/or regenerated with an oxygen-containing gas, preferably one containing 0.1–5 percent volume $O_2$, at 260°–538°C. They are then rechlorinated before re-use using a technique similar to the activation procedure.

The invention is illustrated by the following Example.

EXAMPLE 1

A catalyst of 0.35 percent wt platinum and 11.5 percent wt chlorine on alumina was prepared by chlorinating a platinum-alumina having a surface area of 425 m²/g with a stream of 4 percent vol $CCl_4$ in air flowing at 625 v/v/h at 260°C and atmospheric pressure for 1 hour.

It was used to isomerise a petroleum fraction having the original composition

| | |
|---|---|
| $C_5$ paraffins | 48.2% wt |
| $C_6$ paraffins | 43.4% wt |
| Naphthenes | 4.8% wt |
| Aromatics | 3.3% wt |
| Sulphur | <0.0003% wt |

For part of the time this feedstock was hydrogenated to reduce the aromatics to less than 0.001 percent wt.

The isomerisation process conditions were

| | |
|---|---|
| Temperature | 146°C |
| Pressure | 250 psig |
| Space velocity | 2 v/v/hr |
| $H_2$:hydrocarbon mole ratio | 2.5:1 |
| $CCl_4$ addition to reaction zone 1.0 percent wt by wt of feed. | |

In a series of runs, the reaction system was started up, after preparation of the catalyst in situ in the reactor, by i. purging with nitrogen at ambient temperature
ii. introducing hydrogen also at ambient temperature
iii. increasing pressure from atmospheric to 250 psig
iv. increasing temperature to varying levels indicated below
v. introducing feedstock and 1 percent wt $CCl_4$ preheated to the temperature of (iv) above
vi. adjusting temperature to 146°C as necessary over a period of 10 hours.

Table 1 below shows the results obtained.

Table 1

| Temp. of catalyst at introduction of feed °C | Hydrogenated feed | | Non-hydrogenated feed | |
|---|---|---|---|---|
| | $C_5$ Conversion % wt | $C_6$ Conversion % wt | $C_5$ Conversion % wt | $C_6$ Conversion % wt |
| 90 | 64 | 23 | 57.5 | 16 |
| 118 | 66 | 25 | 60.0 | 18 |
| 132 | 66 | 25.5 | 65.5 | 24 |
| 146 | 69 | 28 | 68 | 26.5 |
| 160 | — | — | 66 | 24 |

The conversions were measured after 30 hours on stream at 146°C. The product composition was measured by gas liquid chromatography and the conversions were calculated from the composition as follows $C_5$ conversion = (iso − $C_5$)/(iso−$C_5$ + n−$C_5$) × 100% wt $C_6$ conversion = (2,2-dimethylbutane)/(total acyclic $C_6$ paraffins) × 100% wt Table 1 shows that the best results were obtained when the feedstock and activating agent were introduced at the operating temperature of 146°C, the improvement being most marked with the non-hydrogenated feed. No further advantage was obtained in introducing the feedstock above the operating temperature.

In a further series of runs, the relative effects of the feedstock and the $CCl_4$ on the results obtained were examined. In these runs the feedstock (without activating agent) was introduced at varying temperatures and brought up to 146°C as necessary over a period of 10 hours. 1 percent wt $CCl_4$ was then introduced at 10 hours on stream at 146°C. The results, again measured after 30 hours at 146°C, are given in Table 2 below.

Table 2

| Temp. of catalyst at introduction of feed °C | Hydrogenated feed | | Non-hydrogenated feed | |
|---|---|---|---|---|
| | $C_5$ Conversion % wt | $C_6$ Conversion % wt | $C_5$ Conversion % wt | $C_6$ Conversion % wt |
| 90 | 65.5 | 24 | 62 | 19.5 |
| 132 | — | — | 62 | 21 |
| 160 | — | — | 59 | 19 |

Comparing Tables 1 and 2, it will be seen that the temperature of introduction of the $CCl_4$ was more important than the temperature of introduction of the food, i.e. when the $CCl_4$ was introduced at 146°C as in Table 2, a relatively good result was obtained even at a feed introduction temperature of 90°C. However, the best results were obtained in Table 1 when both feed and activating agent were introduced at 132°C or above.

We claim:

1. A method of starting up a process for the isomerisation of paraffins boiling in the gasoline boiling range at a temperature in the range 100° to 204°C. in the presence of hydrogen, and a catalyst active for isomerisation at 100° to 204°C. comprising 0.1 to 5 percent wt. of a platinum group metal, alumina, and 1–15 percent wt. chlorine, and in the presence of from 0.01 to 5 percent wt. by weight of feedstock of an activating agent comprising hydrogen chloride or a chloro-substituted derivative of a $C_1$–$C_4$ aliphatic hydrocarbon, the starting up method characterised in that the catalyst bed is brought to an operating temperature in the range 100°–204°C. in the presence of hydrogen and that the paraffin feedstock and activating agent do not contact the catalyst bed until the bed is at said operating temperature, preheating the paraffin feedstock and activating agent to said operating temperature prior to contacting the catalyst bed therewith, and then contacting the catalyst with said preheated feedstock and activator.

2. A method as claimed in claim 1 wherein the operating temperature is in the range 130°–204°C.

3. A method as claimed in claim 1 wherein the activating agent is carbon tetrachloride.

4. A method as claimed in claim 1 wherein the amount of activating agent is 0.1 to 2 percent wt by weight of feedstock.

5. A method as claimed in claim 1 wherein the operating pressure is from 225 to 1,500 psig and the catalyst bed is at the desired operating pressure before the feedstock and activating agent contact it.

6. A method as claimed in claim 5 wherein the operating pressure is from 350 to 1,200 psig.

7. A method as claimed in claim 1 wherein the space velocity is 0.2 to 20 v/v/hr and the hydrogen:hydrocarbon mole ratio is 0.01:1 to 20:1.

8. A method as claimed in claim 7 wherein the space velocity is 1 to 10 v/v/hr and the hydrogen:hydrocarbon mole ratio is 0.5:1 to 15:1.

9. A method as claimed in claim 1 wherein the feedstock consists predominantly of paraffin hydrocarbons selected from $C_4$, $C_5$ and $C_6$ paraffins.

10. A method as claimed in claim 9 wherein the feedstock contains 0.1 to 5 percent wt of aromatics.

11. A method as claimed in claim 1 wherein the catalyst is obtained by contacting the platinum group metal-alumina base with a compound of general formula

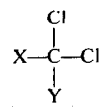

(where X and Y may be the same or different and selected from H, Cl, Br, F or SCl, or where X and Y together may be O or S) under non reducing conditions and at a temperature such that chlorine is taken up by the alumina without the production of free aluminum chloride.

* * * * *

PO-1050
(5/69)

UNITED STATES PATENT OFFICE
CERTIFICATE OF CORRECTION

Patent No. 3,789,082               Dated January 29, 1974

Inventor(s) Terence John Cook and Martin Frederick Olive

It is certified that error appears in the above-identified patent and that said Letters Patent are hereby corrected as shown below:

Column 1, line 17, "contactng" should read --contacting--;

Column 4, line 44, "260°-558°C" should read --260°-538°C--; and

Column 6, Table 2, the second heading under Hydrogenated feed, "$O_6$ Conversion % Wt." should reac --$C_6$ Conversion % Wt.--.

Signed and sealed this 14th day of May 1974.

(SEAL)
Attest:

EDWARD M.FLETCHER,JR.            C. MARSHALL DANN
Attesting Officer                Commissioner of Patents